Feb. 28, 1939.    W. M. SCHOLL    2,148,649
METATARSAL GAUGE
Filed Jan. 18, 1936
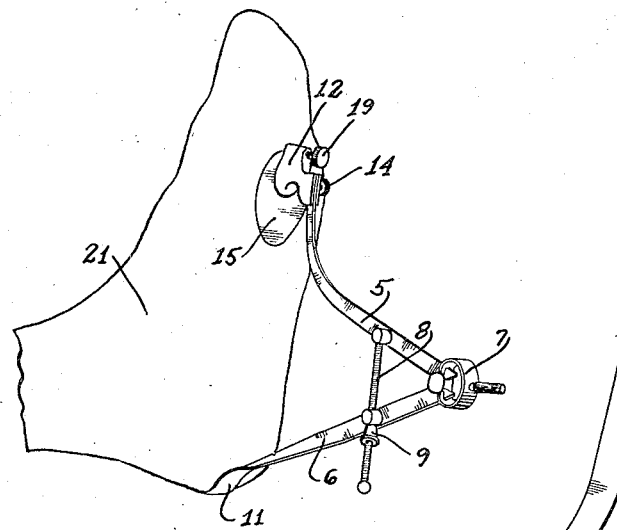
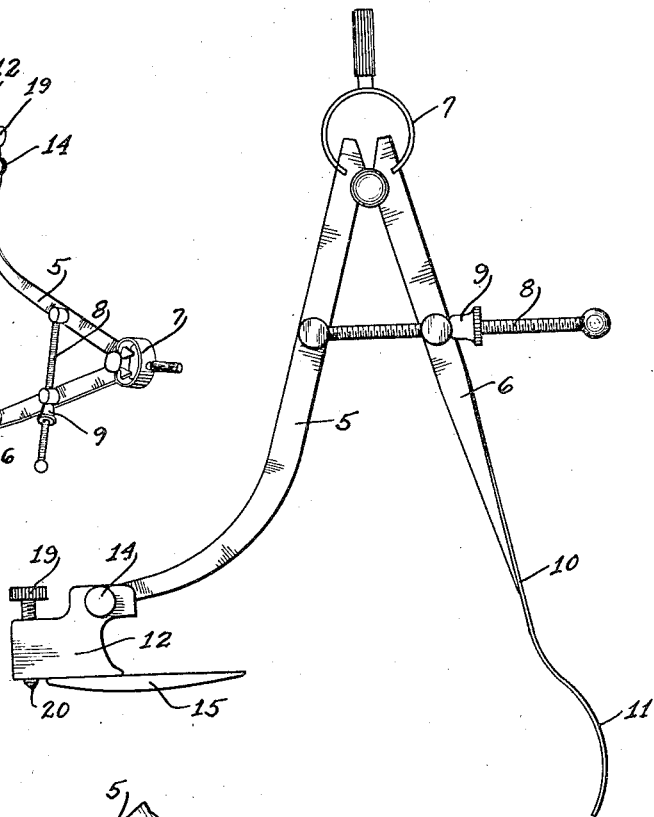
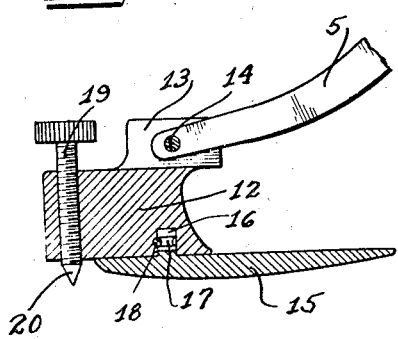
Inventor
William M. Scholl.
by Charles O'Shields Attys.

Patented Feb. 28, 1939

2,148,649

UNITED STATES PATENT OFFICE 2,148,649

METATARSAL GAUGE

William M. Scholl, Chicago, Ill.

Application January 18, 1936, Serial No. 59,671

10 Claims. (Cl. 33—3)

This invention relates to improvements in a gauge highly desirable for indicating definitely the position in an article of footwear for the placing of a foot-corrective appliance, the present invention being especially desirable for use in indicating the location of a metatarsal pad or button, although the invention will have other and various uses and purposes as will be apparent to one skilled in the art.

Metatarsal pads or buttons and similar foot-corrective appliances are many times secured inside the shoe in any suitable manner, such as by gluing them to the insole of the shoe. In view of the great variances in foot deformities or afflictions it is necessary to know the precise location for the corrective appliance in the shoe in order to effect proper treatment of a particular affliction. I am aware that instruments for ascertaining the location of a foot corrective appliance within a shoe have been heretofore provided, but these instruments have not, in most cases, been subject to sufficient adjustment to render the same instrument practicable for both left and right feet, and the instruments formerly known were not of the nature of precision instruments capable of extreme accuracy.

With this in mind, it is an object of the present invention to provide a gauge for locating a foot correction appliance within a shoe, which is a precision instrument capable of extreme accuracy.

Another object of the invention is the provision of a gauge of the character set forth herein which may be first applied to a foot and readily and easily adjusted while in position against the foot.

It is also an object of the invention to provide a gauge of this character made in the form of a precision instrument which may be adjusted at a point remote from the foot-contacting part.

A further object of the invention is the provision of a gauge of this character having an indicating element in simulation of a foot correction appliance, and a heel-engaging portion, with adjustments of the indicating element in a plurality of planes, and means for varying the spread between the indicating element and the heel-engaging part.

It is also an aim of the invention to provide a gauge of the character set forth carrying its own marking means for marking the insole of a shoe to indicate the position for a foot correction appliance, which marking means are adjustable to inoperative and operative positions.

Still another object of the invention is to provide a gauge of this character in the form of a pair of spring bow dividers operable accordingly, one leg carrying an indicating member in simulation of a foot corrective appliance, and the other leg carrying a heel-engaging part.

While some of the more salient features, characteristics and advantages of the present invention have been above pointed out, others will become apparent from the following disclosures taken in conjunction with the accompanying drawing, in which:

Figure 1 is a perspective view of a gauge embodying principles of the present invention, showing the same in operative position against a foot diagrammatically illustrated;

Figure 2 is an enlarged side elevational view of the gauge itself; and

Figure 3 is an enlarged fragmentary part vertical sectional view, with parts in elevation, through that portion of the gauge shown in the lower left hand part of Figure 2.

As shown on the drawing:

In the illustrated embodiment of this invention, there is shown a pair of spring bow dividers comprising a leg 5, a leg 6, a controlling bow spring 7, a spread screw 8, and a nut 9 engageable upon the screw to vary the spread between the legs of the dividers.

At the lower end thereof, the leg 6 is twisted as indicated at 10, and then arced, as at 11, to provide a heel-engaging portion of the proper shape. This portion 11 is designed to reasonably fit the back part of a heel of a foot and also reasonably fit in the heel counter of a shoe. The other leg 5 of the dividers carries on the lower end thereof a block 12, the upper portion of which is split as indicated at 13 in Figure 3 to accommodate the projecting end of the divider leg. A set screw 14 is engaged through the split portion of the block and the shank of this screw extends through the end of the divider leg so as to provide a pivotal connection between the leg and block, which connection may be locked in a desired position of adjustment by tightening the screw.

On the underside of the block is an indicating element 15 of the general shape of a foot correction appliance, in this instance a metatarsal pad or button. The element 15 has an upwardly extending smooth shank 16, grooved as at 17, the shank projecting into a suitable recess or bore in the bottom of the block 12. A suitable key 18 extending into a portion of the block and also into the groove 17 retains the pad in position and yet permits lateral pivotal movement of the pad. Sufficient friction is established in the connection to retain the element 15 in a fixed position of adjustment, but the friction is preferably insufficient to prevent ready adjustment of the element.

Extending vertically through the forward portion of the block is a thumb screw 19 threadedly engaged within the block and having a relatively sharp point 20 on the lower end thereof. This screw is preferably located immediately adjacent the forward edge of the element 15, as close as possible without interfering with the pivotal movement of the element. The screw 19 is preferably unscrewed sufficiently to hide the point 20 in the threaded bore of the block when the device is applied to the foot of a patient, and when the device is disposed inside a shoe, the screw is moved forwardly to expose the point 20 for marking the insole of the shoe.

From the foregoing structure, it will be noted that the element 15 is provided with substantially a universal adjustment in view of the vertical pivotal connection by means of the set screw 14 and the lateral pivotal connection of the element 15 with the block. By these relative adjustments, the element 15 may be properly positioned in the exact location relatively to substantially any particular foot, and the element as may be firmly set against a foot so that it assumes substantially the precise position of the ultimate corrective appliance.

In use, the present invention is extremely simple and yet accurate to a superlative degree. It is obvious from the foregoing that the instrument itself is a precision instrument and may be built and used accordingly.

In Figure 1, I have diagrammatically illustrated a human foot 21. Assuming that the foot is defective or afflicted in the metatarsal arch region, the instrument is applied to the foot, after the retraction of the screw 19, substantially in the manner shown in this figure. The nut 9 may be used to control the dividers for the proper spread; the set screw 14 may be used to establish the proper angle of adjustment in the vertical plane, and the element 15 may be laterally pivoted, as may be deemed best for the particular affliction. With the part 11 of the leg 6 engaging the heel of the foot, the element 15 may be set into the precise location of the corrective pad to be later used.

After this measurement is taken, the instrument is placed in the shoe for the particular foot with the element 11 in engagement with the heel counter inside the shoe, and the element 15 disposed upon the insole of the shoe in a position corresponding to that it formerly occupied against the foot. If desired, the location may be first determined within the shoe and then the screw 19 advanced to expose the sharp point 20, or this point may be exposed prior to the insertion of the instrument in the shoe, as the case may be. After the correct position in the shoe has been ascertained, it is a simple expedient to work the dividers in the manner of a compass and so cause the sharp point 20 to score the insole of the shoe and thus indicate the forward edge location of the pad to be affixed in the shoe.

From the foregoing, it is apparent that I have provided an instrument or gauge which may be made in the form of a precision instrument and used with corresponding accuracy for accurately designating the position within a shoe for the disposition of a foot corrective appliance. It will be noted that the instrument is durable, easily manipulated, and it may be economically manufactured.

I am aware that many changes may be made and numerous details of construction may be varied through a wide range without departing from the principles of this invention, and I, therefore, do not purpose limiting the patent granted hereon otherwise than is necessitated by the prior art.

I claim as my invention:

1. An instrument of the character described in the general form of a pair of dividers, one leg carrying a heel engaging member, and the other leg carrying an element in the general form of a foot corrective appliance, and marking means also carried by said other leg immediately adjacent an edge of said element.

2. A foot corrective appliance gauge, including holding means carrying a heel engaging part and an element to indicate the position of a foot corrective appliance, said element and said part being in spaced relationship and said holding means to vary the space therebetween, being adjustable relatively to said said element being adjustable in a plurality of planes.

3. In an instrument of the character described, a heel engaging part, a position indicating element spaced therefrom, means carrying both said part and said element adjustable to vary the distance therebetween, and a marking member adjustable to operative and inoperative positions associated with said element.

4. In an instrument of the character described, a heel engaging part, a position indicating element, and means carrying both said part and said element in spaced relationship, said element being adjustable in a plurality of planes relatively to said carrying means.

5. In an instrument of the character described, a heel engaging part, a block, and carrying means holding both said part and said block in spaced relationship adjustable to vary the distance therebetween, said block being pivotally connected to said carrying means, and a position indicating element pivoted to said block.

6. In an instrument of the character described, a structure of the general form of a pair of dividers, a heel engaging part on one leg of said structure, a block pivotally carried by the other leg, a position indicating element pivotally connected to the underside of said block, and a marking member retractably mounted in said block adjacent an edge of said element.

7. An instrument for locating the position of a metatarsal arch support, including a structure in the general form of a pair of dividers, a heel engaging part on one leg of the structure, and a member having in general an egg-shaped contour in simulation of an arch support pivotally carried by the other leg to permit lateral adjustment of the member to render said instrument suitable for both left and right feet.

8. A gauge to indicate the position of a foot corrective appliance, including a pair of legs angularly disposed, means to selectively vary the angle between said legs, a part shaped for engagement with the human heel carried by one of said legs, and a part carried by the other leg and of proper configuration to contact the human foot in the manner of the correction device to be subsequently used.

9. A gauge to indicate the position of a foot corrective appliance, including a pair of legs angularly disposed, means to selectively vary the angle between said legs, a part shaped for engagement with the human heel carried by one of said legs, and a part carried by the other leg and of proper configuration to contact the human foot in the manner of the correction device to be subsequently used, and a marker also carried by said other leg to indicate in an article of footwear the position of the correction device.

10. A gauge to indicate the position of a foot corrective appliance, including supporting means, a heel engaging part carried by said means, a part shaped for engagement with the human foot in the manner of a foot correction appliance also carried by said means, and connecting means pivoted to the last said part and pivoted to said supporting means thus permitting adjustment of the part in a plurality of planes.

WILLIAM M. SCHOLL.